United States Patent [19]

Okami et al.

[11] 3,994,991
[45] Nov. 30, 1976

[54] THERMOPLASTIC RESIN COMPOSITION COMPRISING A VINYL CHLORIDE POLYMER AND A GRAFT COPOLYMER

[75] Inventors: Shoji Okami; Shigeki Yasunaga; Yoshihiko Hashimoto; Teizo Saito, all of Kobe, Japan

[73] Assignee: Kanegafuchi Chemical Industries Co., Ltd., Japan

[22] Filed: Aug. 25, 1976

[21] Appl. No.: 607,823

Related U.S. Application Data

[63] Continuation-in-part of Ser. No. 495,516, Aug. 7, 1974, abandoned.

[30] Foreign Application Priority Data

Aug. 11, 1973  Japan................................ 48-90279

[52] U.S. Cl....................... 260/876 R; 204/159.14; 204/159.2; 260/885
[51] Int. Cl.$^2$......................................... C08L 51/04
[58] Field of Search......................... 260/876 R, 885

[56] References Cited
UNITED STATES PATENTS

| | | | |
|---|---|---|---|
| 3,448,173 | 6/1969 | Ryan et al............................ | 260/876 |
| 3,793,406 | 2/1974 | Bortnick et al..................... | 260/884 |
| 3,804,925 | 4/1974 | Kato et al........................... | 260/885 |
| 3,886,235 | 5/1975 | Kagakykabushiki................ | 260/876 |

*Primary Examiner*—Carman J. Seccuro
*Attorney, Agent, or Firm*—Wenderoth, Lind & Ponack

[57] ABSTRACT

A thermoplastic resin composition of vinyl chloride polymer improved in impact strength and weather resistance, which comprises (1) 30 to 97 parts by weight of at least one of vinyl chloride polymers having not less than 70% by weight of vinyl chloride units and (2) 70 to 3 parts by weight of at least one of graft copolymers comprising (2-1) a backbone polymer and (2-2) monomers grafted in two stages thereon in a proportion of 20 : 80 to 80 : 20 by weight, the backbone polymer comprising (2-1-1) units of at least one of alkyl acrylates, of which not more than 20% by weight may be substituted with units of at least one of monovinylic monomers copolymerizable therewith, and (2-1-2) units of at least one of cross-linkable monomers in an amount of 0.01 to 10% by weight of the alkyl acrylates and, when used, the monovinylic monomers and the graft monomers comprising (2-2-1) 30 to 100% by weight of at least one of alkyl methacrylates, 0 to 70% by weight of at least one of aromatic vinyl compounds, 0 to 50% by weight of at least one of vinylic cyanides and 0 to 30% by weight of at least one of other monomers copolymerizable therewith based on the total weight of these monomers as those grafted at the first stage and (2-2-2) 85 to 100% by weight of at least one of aromatic vinyl compounds, alkyl acrylates and vinyl esters and 0 to 15% by weight of at least one of other monomers copolymerizable therewith based on the total weight of these monomers as those grafted at the second stage in a proportion of 95 : 5 to 50 : 50 by weight.

1 Claim, No Drawings

THERMOPLASTIC RESIN COMPOSITION COMPRISING A VINYL CHLORIDE POLYMER AND A GRAFT COPOLYMER

This is a continuation-in-part application of our copending application Ser. No. 495,516, filed Aug. 7, 1974, now abandoned.

The present invention relates to a thermoplastic resin composition of vinyl chloride polymer. More particularly, it relates to a thermoplastic resin composition of vinyl chloride polymer improved in impact strength and weather resistance which comprises a vinyl chloride polymer and a graft copolymer comprising an alkyl acrylate polymer as a backbone polymer and certain monomers grafted thereon.

Vinyl chloride polymers are widely used in various technical fields due to their favorable mechanical and chemical properties. However, they have some certain deflective properties such as low impact strength and inferior weather resistance. In order to improve these defective properties, there have been proposed various methods, among which the most effective one is blending into vinyl chloride polymers graft copolymers obtained by grafting various monomers to conjugated diene elastomers. Since, however, the graft copolymers have a number of double bonds in the main chains, their weather resistance is not good, and they are not suitable for the outdoor's use. For overcoming such drawback, a proposal has been made to use chemically saturated polyalkyl acrylates, which are excellent in weather resistance, in place of conventional conjugated diene elastomers. However, they are insufficient to improve the impact strength of vinyl chloride polymers. In addition, it is usually quite difficult to graft various monomers on polyalkyl acrylates due to their saturation.

As the result of the extensive study, it has now been found that a graft copolymer obtained by grafting certain monomers capable of producing polymers readily compatible with vinyl chloride polymers on a block polymer mainly consisting of units of alkyl acrylates and then other certain monomers capable of producing polymers hardly compatible with vinyl chloride polymers on the resulting product is effective in improvement of impact strength and weather resistance of vinyl chloride polymers.

Accordingly, a main object of the present invention is to provide a modifier which is useful for improving the impact strength and the weather resistance of vinyl chloride polymers. Another object of this invention is to provide a thermoplastic resin composition of vinyl chloride polymer improved in the impact strength and the weather resistance. A further object of the invention is to provide a method for improving the impact strength and the weather resistance of vinyl chloride polymers. These and other objects of the invention will be apparent to those skilled in the art from the foregoing and subsequent descriptions.

The thermoplastic resin composition of vinyl chloride polymer according to the present invention comprises (1) 30 to 97 parts by weight of at least one of vinyl chloride polymers having not less than 70 % by weight of vinyl chloride units and (2) 70 to 3 parts by weight of at least one of graft copolymers comprising (2-1) a backbone polymer and (2-2) monomers grafted in two stages thereon in a proportion of 20 : 80 to 80 : 20 by weight, the backbone polymer comprising (2-1-1) units of at least one of alkyl acrylates, of which not more than 20 % by weight may be substituted with units of at least one monovinylic monomers copolymerizable therewith, and (2-1-2) units of at least one of cross-linkable monomers in an amount of 0.01 to 10 % by weight of the alkyl acrylates and, when used, the monovinylic monomers and the graft monomers comprising (2-2-1) 30 to 100 % by weight of at least one of alkyl methacrylates, 0 to 70 % by weight of at least one of aromatic vinyl compounds, 0 to 50 % by weight of at least one of vinylic cyanides and 0 to 30 % by weight of at least one of other monomers copolymerizable therewith based on the total weight of these monomers as those grafted at the first stage and (2-2-2) 85 to 100 % by weight of at least one of aromatic vinyl compounds, alkyl acrylates and vinyl esters and 0 to 15 % by weight of at least one of other monomers copolymerizable therewith based on the total weight of these monomers as those grafted at the second stage in a proportion of 95 : 5 to 50 : 50 by weight.

In the thermoplastic resin composition of the present invention, one of the essential components is a vinyl chloride polymer having not less than 70 % by weight of vinyl chloride units. Thus, the vinyl chloride polymer may be polyvinyl chloride or a copolymer of vinyl chloride with any copolymerizable vinylic monomer(s) wherein the content of vinyl chloride units is not less than 70 % by weight. Examples of such vinylic monomer(s) are aromatic vinyl compounds (e.g. styrene, vinyltoluene, α-methylstyrene, chlorostyrene, bromostyrene), vinylic cyanides (e.g. acrylonitrile, methacrylonitrile), vinyl ethers (e.g. butyl vinyl ether, octyl vinyl ether, stearyl vinyl ether), alkyl methacrylates (e.g. methyl methacrylate, ethyl methacrylate, butyl methacrylate), vinyl halides (e.g. vinyl chloride), vinylidene halides (e.g. vinylidene chloride), etc.

The other essential component is a graft copolymer comprising a backbone polymer and monomers grafted thereon in a proportion of from 20 : 80 to 80 : 20.

The backbone polymer comprises units of at least one of alkyl acrylates and units of at least one of cross-linkable monomers.

The alkyl acrylate(s) used for the formation of the backbone polymer may be those having an alkyl moiety of 2 to 8 carbon atoms. Specific examples are ethyl acrylate, propyl acryate, n-butyl acrylate, isobutyl acrylate, pentyl acrylate, hexyl acrylate, n-octyl acrylate, 2-ethylhexyl acrylate, etc. Among them, particularly preferred are n-butyl acrylate and 2-ethylhexyl acrylate. The alkyl acrylate(s) may be partly replaced by any monovinylic monomer(s) copolymerizable therewith in an amount of not more than 20 % by weight of the alkyl acrylate(s). Examples of such monovinylic monomer(s) are vinyl halides (e.g. vinyl chloride), vinylidene halides (e.g. vinylidene chloride), vinylic cyanides (e.g. acrylonitrile, methacrylonitrile), vinyl ethers (e.g. butyl vinyl ether, octyl vinyl ether, stearyl vinyl ether), aromatic vinyl compounds (e.g. styrene, vinyltoluene, α-methylstyrene, chlorostyrene, bromostyrene), alkyl methacrylates (e.g. methyl methacrylate, ethyl methacrylate, butyl methacrylate), acrylic acid, methacrylic acid, etc. When the alkyl acrylate(s) are partly replaced by the vinylic monomer(s) as above, the resulting backbone copolymer is preferred to be the one of which the glass transition point is lower than about −10° C.

Examples of the cross-linkable monomer(s) are mono or polyethylene glycol diacrylates (e.g. ethylene glycol diacrylate, diethylene glycol diacrylate, triethylene glycol diacrylate, tetraethylene glycol diacrylate), mono or polyethylene glycol dimethacrylates (e.g. ethylene glycol dimethacrylate, diethylene glycol dimethacrylate, triethylene glycol dimethacrylate, tetraethylene glycol dimethacrylate), divinylbenzene, di or triallyl compounds (e.g. diallyl phthalate, diallyl maleate, diallyl succinate, triallyltriazine), allyl esters (e.g. allyl acrylate, allyl methacrylate), etc. The amount of the cross-linkable monomer(s) may be usually from 0.01 to 10 % by weight, preferably from 0.1 to 5.0 % by weight, based on the weight of the alkyl acrylate(s) and, when used, the monovinylic monomer(s).

For preparation of the backbone polymer, the alkyl acrylate(s) and, when used, the monovinylic monomer(s) with the cross-linkable monomer(s) may be subjected to polymerization in a conventional procedure, preferably under the conditions conventionally adopted for emulsion polymerization. As the emulsifier, there may be used a cationic surfactant, an anionic surfactant or a non-ionic surfactant. The polymerization initiator may be, for instance, any conventional water-soluble peroxide, redox type catalyst or the like. When desired, a polymerization regulator, a builder or the like may be also added to the reaction system. The polymerization temperature is usually from 20° to 95° C, preferably from 30° to 70° C. The monomeric components may be charged in a reactor all at once or introduced therein portionwise continuously or intermittently. It is usually preferred to regulate the polymerization conditions appropriately so as to obtain an aqueous dispersion of the backbone polymer in a particle size of about 0.06 to 0.5 $\mu$, preferably of about 0.08 to 0.3 $\mu$.

The thus obtained backbone polymer in aqueous dispersion, i.e. in latex, is then graft polymerized with certain kinds of monomers in two stages.

The monomer(s) to be grafted at the first stage are those capable of producing polymers readily compatible with the vinyl chloride polymer(s). Such monomers comprise 30 to 100 % by weight of at least one of alkyl methacrylates, 0 to 70 % by weight of at least one of aromatic vinyl compounds, 0 to 50 % by weight of at least one of vinylic cyanides and 0 to 30 % by weight of at least one of other monomers copolymerizable therewith based on the total weight of these monomers.

As the alkyl methacrylate(s), there may be used the ones having an alkyl moiety of 1 to 4 carbon atoms. Specific examples are methyl methacrylate, ethyl methacrylate, n-propyl methacrylate, isopropyl methacrylate, n-butyl methacrylate, isobutyl methacrylate, t-butyl methacrylate, etc. When the amount of the alkyl methacrylate(s) is smaller than the said lower limit, the impact strength will become inferior with deterioration. Examples of the aromatic vinyl compound(s) are styrene, vinyltoluene, $\alpha$-methyl styrene, chlorostyrene, bromostyrene, vinylcarbazole, vinylbiphenyl, etc. Among them, particularly preferred is styrene. When the amount of the aromatic vinyl compound(s) is larger than the said upper limit, the impact strength and the weather resistance of the resulting thermoplastic resin composition will be lowered. As the vinylic cyanide(s), there may be exemplified acrylonitrile, methacrylonitrile and the like. Examples of the other monomer(s) copolymerizable with them are acrylic acid and its esters (e.g. methyl acrylate, ethyl acrylate, propyl acrylate, n-butyl acrylate, isobutyl acrylate, pentyl acrylate, hexyl acrylate, n-octyl acrylate, 2-ethylhexyl acrylate, hydroxyethyl acrylate), methacrylic acid and its esters (e.g. n-butyl methacrylate, pentyl methacrylate, hexyl methacrylate, phenyl methacrylate, benzyl methacrylate, hydroxyethyl methacrylate), acrylamide and its N-substituted derivatives, methacrylamide and its N-substituted derivatives, N-substituted naphthalylamides, alkyl vinyl ethers, vinyl alkanoates, vinyl halides, vinylidene halides, etc.

The monomer(s) to be grafted at the second stage are those capable of producing polymers hardly compatible with the vinyl chloride polymer(s). Such monomers comprise 85 to 100 % by weight of at least one of aromatic vinyl compounds, alkyl acrylates and vinyl esters and 0 to 15 % by weight of at least one of other monomers copolymerizable therewith based on the total weight of these monomers.

Examples of the aromatic vinyl compound(s), the alkyl acrylate(s) and the other monomer(s) copolymerizable with them are those as mentioned above. Examples of the vinyl ester(s) are vinyl acetate, vinyl acrylate, vinyl butyrate, etc.

The proportion of the amount of the backbone polymer and the total amount of the said graft monomeric components is from 20 : 80 to 80 : 20 by weight. In the graft monomeric components, the weight ratio of the monomer(s) to be grafted at the first stage and the monomer(s) to be grafted at the second stage is from 95 : 5 to 50 : 50.

For preparation of the graft copolymer, the backbone polymer and the monomer(s) to be grafted at the first stage are subjected to graft polymerization in a conventional procedure, favorably under the conditions conventionally adopted for emulsion polymerization. After the above graft polymerization is almost completed, the resulting product is further graft polymerized with the monomer(s) to be grafted at the second stage in a conventional manner, preferably under the conditions conventionally adopted for emulsion polymerization. If desired, any cross-linkable monomer may be added to the reaction system on either or both of the first stage and second stage graft polymerization. Concerning to the reaction conditions, the substantially same considerations as in the production of the backbone polymer may be taken.

The recovery of the graft copolymer from the reaction mixture, for instance, the aqueous dispersion may be effected in a conventional manner comprising salting out, precipitating, washing and/or drying.

The above obtained graft copolymer is blended into the vinyl chloride polymer in a weight ratio of 3 : 97 to 70 : 30 to give a thermoplastic resin composition of the invention. When the proportion of the graft copolymer is smaller than the said lower limit, the improvement of the impact strength is insufficient. When larger than the said upper limit, the hardness and the stiffness are deteriorated. If desired, any conventional additive such as a heat stabilizer, an aging inhibitor, an ultraviolet ray absorber, a lubricant, a filler, an antistatic agent or a plasticizer may be incorporated into the thermoplastic resin composition.

The blending or mixation may be accomplished by the use of any conventional mixing machine such as rolls, Banbury mixer, extruder or injection molding machine.

Alternatively, the mixation of the graft copolymer and the vinyl chloride polymer with or without any additive may be accomplished by adding the vinyl chloride polymer and, when used, the additive to an aqueous dispersion of the graft copolymer and co-precipitating them from the resulting mixture.

Practical and presently preferred embodiments of the invention are illustratively shown in the following examples wherein parts and % are by weight, unless otherwise indicated.

EXAMPLE 1

A. Preparation of a backbone polymer

In a reactor equipped with a thermometer, a stirrer a reflux condenser, an inlet for nitrogen gas and an apparatus for addition of monomers, there were charged the following materials:

| | Part(s) by weight |
|---|---|
| Distilled water | 250 |
| Potassium rhodinate | 0.5 |
| Semi-hardened beef tallow sodium salt ("NS Soap" manufactured by Kao SOAP Co., Ltd.) | 0.5 |
| Sodium naphthalenesulfonate-formaldehyde condensate ("Demol N" manufactured by Kao SOAP Co., Ltd.) | 0.2 |
| Sodium formylsulfoxylate | 0.2 |
| $Na_3PO_4 \cdot 12H_2O$ | 0.45 |
| Disodium ethylenediamine-tetraacetate | 0.008 |
| Ferrous sulfate heptahydrate | 0.002 |

The contents were stirred at 40° C in nitrogen stream, and a part (5 %) of a monomeric mixture consisting of butyl acrylate (100 parts), allyl methacrylate (1.0 part) and cumene hydroperoxide (0.1 part) were added thereto. To the resultant mixture, the rest (95 %) of the monomeric mixture were dropwise added in 4 hours continuously. After finishing the addition, the reaction was continued for 1.5 hours to complete the polymerization. Conversion, 99 %. The particle size of the backbone polymer in the obtained latex is 0.09 $\mu$, when calculated on the basis of the turbidity measured at 546 m$\mu$.

B. Preparation of a graft copolymer

In the reactor used in the preparation of the backbone polymer, there were charged the backbone polymer (65 parts) in latex obtained in (A) and water (250 parts), and the contents were stirred at 60° C in nitrogen stream. A mixture of glacial acetic acid (0.379 part), potassium hydroxide (0.379 part) and sodium formylsulfoxylate (0.14 part) was added thereto. After 30 minutes, a monomeric mixture of methyl methacrylate, triethylene glycol dimethacrylate (1 % of methyl methacrylate), and cumene hydroperoxide (0.4 % of methyl methacrylate) was dropwise added in 1 hour, and the reaction was continued for further 1 hour. Then, a monomeric mixture of styrene, triethylene glycol dimethacrylate (1 % of styrene) and cumene hydroperoxide (0.4 % of styrene) was dropwise added thereto in 30 minutes, and the reaction was continued for further 1.5 hours to complete the graft copolymerization. Conversion, 99 %.

To the thus obtained aqueous dispersion, a solution of calcium chloride was added, and the resultant mixture was heated. After cooling, the precipitate was collected by filtration, washed and dried to give a graft copolymer as powdery resin.

C. Preparation of a vinyl chloride resin composition

The graft copolymer obtained in (B) (13 parts) was admixed with polyvinyl chloride ("Kanevinyl S-1001", manufactured by Kanegafuchi Chemical Ind. Co., Ltd.) (100 parts), tribasic lead sulfate (2.0 parts), dibasic lead stearate (1.0 part), lead stearate (0.5 part) and calcium stearate (0.5 part). The resultant mixture was extruded by an extruder at a die temperature of 185° C. The extruded product was cut to make test pieces, on which impact strength was measured at 23° C by a conventional procedure before and after weather proof test by a weatherometer.

The results are shown in Table 1, Run Nos. 1 to 4.

For comparison, a graft copolymer was prepared by graft polymerizing the backbone polymer obtained in (A) with a monomeric mixture of methyl methacrylate, styrene, triethylene glycol dimethacrylate (0.35 part) and cumene hydroperoxide (0.14 part) in a single stage as in (B). The obtained graft copolymer was blended with polyvinyl chloride and test pieces were prepared from the resulting vinyl chloride resin composition as in (C). The test pieces were subjected to measurement of impact strength.

The results are shown in Table 1, Run Nos. A to I.

Table 1

| | Monomer component | | | Izod impact strength (kg . cm/cm$^2$) | | | |
|---|---|---|---|---|---|---|---|
| | Methyl meth- | | Before irradia- | | After irradiation | | |
| Run No. | acrylate | Styrene | tion | 200 H | 400 H | 600 H | 1000 H |
| | (parts) | (parts) | | | | | |
| 1 | 34 | 1 | 58.1 | 24.9 | 23.0 | 23.9 | 8.1 |
| 2 | 32 | 3 | 128.4 | 98.2 | 35.1 | 33.3 | 26.4 |
| 3 | 30 | 5 | 129.0 | 80.3 | 68.6 | 35.1 | 20.3 |
| 4 | 25 | 10 | 139.8 | 70.6 | 70.1 | 44.2 | 30.0 |
| | (%) | (%) | | | | | |
| A | 100 | 0 | 32.4 | 7.9 | 8.0 | 7.5 | 6.7 |
| B | 95 | 5 | 29.5 | 13.1 | 13.0 | 13.5 | — |
| C | 90 | 10 | 67.1 | 13.1 | — | — | — |
| D | 85 | 15 | 85.1 | 26.4 | 19.1 | 18.8 | — |
| E | 85 | 15 | 90.7 | 32.7 | 20.3 | 19.8 | — |
| F | 80 | 20 | 29.3 | 19.2 | — | — | — |
| G | 80 | 20 | 34.8 | 18.6 | 15.0 | 17.7 | — |
| H | 75 | 25 | 18.2 | 20.9 | — | — | — |
| I | 70 | 30 | 22.3 | 19.2 | — | — | — |

Note: 1. The Izod impact strength represents the value determined on the notched (¼ inch) test piece according to ASTM (American Society of Testing and Materials) D 256-56.

2. The irradiation test was effected at a black panel temperature of 63° C for 12 minutes with a rainfall for 2 hours by a weatherometer.

From the above results, it is apparent that the modifier obtained by grafting first a large amount of methyl methacrylate and then a small amount of styrene is superior to that obtained by grafting methyl methacrylate and styrene in a single stage.

EXAMPLE 2

A backbone polymer (65 parts) in latex, prepared as in Example 1 (A) but using a fatty acid sodium salt (1.5 parts) as the emulsifier, was graft polymerized first with a mixture of methyl methacrylate, butyl acrylate, triethylene glycol dimethacrylate and cumene hydroperoxide and then with a mixture of styrene, triethylene glycol dimethacrylate and cumene hydroperoxide as in Example 1 (B).

The obtained graft copolymer (13 parts) was admixed with polyvinyl chloride (100 parts) tribasic lead sulfate (2.0 parts), dibasic lead stearate (1.0 part), lead stearate (0.5 part) and calcium stearate (0.5 part). The resultant mixture was extruded by an extruder at a die temperature of 185° C. The extruded product was cut to make test pieces, on which impact strength was measured at 23° C by a conventional procedure before and after weather proof test by a weatherometer.

The results are shown in Table 2 (A).

For comparison, the test pieces were prepared in the same manner as above but using the graft copolymer produced by graft polymerizing the backbone polymer with a mixture of methyl methacrylate, butyl acrylate, triethylene glycol dimethacrylate and cumene hydroperoxide in a single stage and subjected to measurement of the impact strength.

The results are shown in Table 2 (B).

Table 2 (A)

| | Monomer component (%) | | | Izod impact strength (kg . cm/cm²) | | |
|---|---|---|---|---|---|---|
| | First stage | | Second stage | Before irradi- | After irradiation | |
| Run No. | Methyl meth-acrylate | Butyl acrylate | Styrene | ation | 300 H | 500 H |
| 1 | 90 | 5 | 5 | 117 | 64.6 | 44.5 |
| 2 | 85 | 5 | 10 | 128 | 90.4 | 51.4 |
| 3 | 80 | 5 | 15 | 104 | 85.1 | 42.1 |
| 4 | 70 | 10 | 20 | 102 | 73.7 | 40.3 |

Table 2 (B)

| | Monomer component (%) | | | Izod impact strength (kg . cm/cm²) | | |
|---|---|---|---|---|---|---|
| Run No. | Methyl meth-acrylate | Butyl acrylate | Styrene | Before irradi-ation | After irradiation 300 H | 500 H |
| A | 90 | 5 | 5 | 44 | 17.9 | — |
| B | 85 | 5 | 10 | 40 | 19.2 | — |
| C | 80 | 5 | 15 | 50 | 23.7 | — |
| D | 70 | 10 | 20 | 35 | 25.0 | — |

EXAMPLE 3

The backbone polymer (65 parts) in latex, prepared as in Example 1 (A) but using a fatty acid sodium salt (1.5 parts) as the emulsifier, was graft polymerized first with a mixture of methyl methacrylate, acrylonitrile, triethylene glycol dimethacrylate and cumene hydroperoxide and then with a mixture of butyl acrylate, triethylene glycol dimethacrylate and cumene hydroperoxide as in Example 1 (B).

The obtained graft copolymer (13 parts) was admixed with polyvinyl chloride (100 parts) tribasic lead sulfate (2.0 parts), dibasic lead strearate (1.0 part), lead stearate (0.5 part) and calcium stearate (0.5 part). The resultant mixture was extruded by an extruder at a die temperature of 185° C. The extruded product was cut to make test pieces, on which impact strength was measured at 23° C by a conventional procedure before and after weather proof test by a weatherometer.

The results are shown in Table 3.

Table 3

| | Monomer component (%) | | | Izod impact strength (kg . cm/cm²) | |
|---|---|---|---|---|---|
| | First stage | | Second stage | | After irradi- |
| Run No. | Methyl meth-acrylate | Acrylo-nitrile | Butyl acry-late | Before irradi-ation | ation (300 H) |
| 1 | 90 | 5 | 5 | 50 | 12.3 |
| 2 | 85 | 10 | 5 | 108 | 59.5 |
| 3 | 80 | 15 | 5 | 128 | 67.7 |
| 4 | 85 | 5 | 10 | 125 | 47.6 |

EXAMPLE 4

The backbone polymer (65 parts) in latex, prepared as in Example 1 (A), was graft polymerized first with a mixture of methyl methacrylate, acrylonitrile and cumene hydroperoxide and then with a mixture of styrene and cumene hydroperoxide as in Example 1 (B).

The obtained graft copolymer (13 parts) was admixed with polyvinyl chloride (100 parts) tribasic lead sulfate (2.0 parts), dibasic lead stearate (1.0 part), lead stearate (0.5 part) and calcium stearate (0.5 part). The resultant mixture was extruded by an extruder at a die temperature of 185° C. The extruded product was cut to make test pieces, on which impact strength was measured at 23° C by a conventional procedure before and after weather proof test by a weatherometer.

The results are shown in Table 4 wherein the impact strength of a commercially available MBS resin (methyl methacrylate-butadiene-styrene terpolymer) is also shown for comparison.

Table 4

| | Monomer component (%) | | | Izod impact strength (kg . cm/cm²) | |
|---|---|---|---|---|---|
| | First stage | | Second stage | | After irradi- |
| Run No. | Methyl meth-acrylate | Acrylo-nitrile | Styrene | Before irradi-ation | ation (300 H) |
| 1 | 90 | 5 | 5 | 26.9 | 24.2 |
| 2 | 85 | 5 | 10 | 34.6 | 33.2 |
| 3 | 80 | 10 | 10 | 29.3 | 24.5 |
| 4 | 80 | 15 | 5 | 83.6 | 72.2 |
| 5 | 75 | 15 | 10 | 83.5 | 67.8 |
| 6 | 75 | 10 | 15 | 74.9 | 46.3 |
| 7 | 70 | 10 | 20 | 101.8 | 66.0 |
| 8 | 70 | 20 | 10 | 102.2 | 67.4 |
| 9 | 70 | 25 | 5 | 105.9 | 92.6 |
| Control | MBS | | | 78.9 | 8.8 |

What is claimed is:

1. A thermoplastic resin composition which comprises (1) 30 to 97 parts by weight of at least one vinyl chloride polymer having not less than 70 % by weight of vinyl chloride units and (2) 70 to 3 parts by weight of at least one graft copolymer comprising a backbone polymer and monomers grafted in two stages thereon in a proportion of 20 : 80 to 80 : 20 by weight, the backbone polymer comprising units of at least one alkyl acrylate, of which not more than 20 % by weight may be substituted with units of at least one monovinylic monomer copolymerizable therewith, and units of at least one cross-linkable monomer in an amount of 0.01 to 10 % by weight of the alkyl acrylates and, any monovinylic monomers and the graft monomers comprising as the first stage 30 to 100 % by weight of at least one alkyl methacrylate, 0 to 70 % by weight of at least one aromatic vinyl compound, 0 to 50 % by weight of at least one vinyl cyanide and 0 to 30 % by weight of at least one other monomer copolymerizable therewith based on the total weight of these monomers of those grafted at the first stage and as the second stage 85 to 100 % by weight of at least one monomer selected from the group consisting of aromatic vinyl compounds, alkyl acrylates and vinyl esters and 0 to 15 % by weight of at least one other monomer copolymerized therewith, based on the total weight of the monomers grafted at the second stage, in a proportion of 95 : 5 to 50 : 50 by weight of the first stage to the second stage monomers.

* * * * *